United States Patent
Shires et al.

(10) Patent No.: US 10,340,733 B2
(45) Date of Patent: Jul. 2, 2019

(54) 3-WIRE TRANSFORMER-FREE UPS SYSTEM AND METHOD OF CONTROL TO REDUCE COMMON MODE CURRENT

(71) Applicant: Liebert Corporation, Columbus, OH (US)

(72) Inventors: Edwin Shires, Powell, OH (US); Terry D. Bush, Westerville, OH (US); Brian P. Heber, Delaware, OH (US); Charles F. Blair, Powell, OH (US)

(73) Assignee: Vertiv Corporation, Columbus, OH (US)

( * ) Notice: Subject to any disclaimer, the term of this patent is extended or adjusted under 35 U.S.C. 154(b) by 891 days.

(21) Appl. No.: 14/615,814

(22) Filed: Feb. 6, 2015

(65) Prior Publication Data
US 2015/0244206 A1 Aug. 27, 2015

Related U.S. Application Data

(60) Provisional application No. 61/944,619, filed on Feb. 26, 2014.

(51) Int. Cl.
*H02J 9/00* (2006.01)
*H02J 9/06* (2006.01)

(52) U.S. Cl.
CPC ........... *H02J 9/062* (2013.01); *Y10T 307/549* (2015.04)

(58) Field of Classification Search
CPC .. H02J 9/062; H02J 3/16; H02J 3/1807; H02J 3/1842; H02J 9/08; Y10T 307/549;
(Continued)

(56) References Cited

U.S. PATENT DOCUMENTS

| | | | | | |
|---|---|---|---|---|---|
| 5,757,099 A | * | 5/1998 | Cheng | ....................... | H02J 3/01 307/105 |
| 2005/0012395 A1 | * | 1/2005 | Eckroad | .................... | H02J 3/16 307/44 |

(Continued)

FOREIGN PATENT DOCUMENTS

CN 103023364 A 4/2013

OTHER PUBLICATIONS

First Chinese Office Action regarding CNSN 2015100887575, dated May 10, 2018.

(Continued)

*Primary Examiner* — Rexford N Barnie
*Assistant Examiner* — Elim Ortiz
(74) *Attorney, Agent, or Firm* — Harness, Dickey & Pierce, P.L.C.

(57) ABSTRACT

A common mode choke in a 3-wire transformer free UPS system with which different rectifier and bypass power sources are used is eliminated by using different types of PWM control depending on whether the inverter is paralleled with the bypass power source. When the inverter is paralleled with the bypass power source, a type of PWM control is used that does not have common mode voltage injection. When the inverter is not paralleled with the bypass power source, a type of PWM control is used that has common mode voltage injection. In an aspect, the PWM control that does not have common mode voltage injection is sine-triangle PWM and the PWM control that has common mode voltage injection is space-vector PWM.

3 Claims, 5 Drawing Sheets

(58) Field of Classification Search
CPC ............. Y10T 307/505; Y10T 307/516; Y10T 307/625; Y10T 307/631; Y02E 40/16; Y02E 40/22; Y02E 40/34
See application file for complete search history.

(56) References Cited

U.S. PATENT DOCUMENTS

2012/0181871 A1    7/2012  Johansen et al.
2013/0057297 A1*   3/2013  Cheng ................... H02M 1/32
                                              324/548

OTHER PUBLICATIONS

Second Chinese Office Action regarding Chinese Application No. 201500887575, dated Dec. 26, 2018.
Jianqiang, Liu, "Study and Comparison of the Common-Mode Motor Voltage in Different Kinds of PWM Control Methods", Journal of Beijing Jiatong University, vol. 29, No. 5, Oct. 2005.

* cited by examiner

# US 10,340,733 B2

3-WIRE TRANSFORMER-FREE UPS SYSTEM AND METHOD OF CONTROL TO REDUCE COMMON MODE CURRENT

CROSS-REFERENCE TO RELATED APPLICATIONS

This application claims the benefit of U.S. Provisional Application No. 61/944,619, filed on Feb. 26, 2014. The entire disclosure of this application is incorporated herein by reference.

FIELD

The present disclosure relates to a transformer-free uninterruptible power supply system and method of controlling it to reduce common mode current.

BACKGROUND

This section provides background information related to the present disclosure which is not necessarily prior art.

A 3-wire transformer-free uninterruptible power supply ("UPS") system is a 3 phase system without input and output transformers with the 3-wires all being hot. This type of UPS system is typically designed so that the DC voltage on its DC bus is as low as possible so that lower cost semiconductor devices and filter capacitors can be used. This choice, however, as is known in the art, requires that the type of pulse width modulation ("PWM") control used to control the inverter of the UPS system include common mode voltage injection so that the inverter produces at its output the desired peak AC output line-to-line voltage.

During normal on-line modes of operation (when the inverter is not paralleled with the bypass power source), this common mode voltage is not seen by the load or the utility. However, in 3-wire transformer-free UPS systems for which separate power sources for the rectifier and bypass are utilized, when the inverter of the UPS is paralleled with the bypass power source, this common mode voltage can drive a common mode current. This common mode current gets larger if the rectifier power source is not in sync with the bypass source. To alleviate this problem, a common mode choke is inserted between the rectifier power source and the rectifier that reduces the common mode current. This common mode choke is basically an inductor that is expensive, takes up a fair amount of space and is very heavy.

FIG. 1 is a basic block diagram of a of a typical a prior art 3-wire transformer-free double conversion UPS system 100 where the power sources to which the rectifier and bypass switch are coupled are separate power sources. UPS system 100 includes a common mode choke 102, a rectifier input inductor 104, a rectifier input capacitor 106, a three phase rectifier 108, a DC bus 110, a three phase inverter 112, an inverter output inductor 114, an inverter output capacitor 116, a battery (not shown), a bypass switch 120, and a control module 122. DC bus 110 is a split DC bus having a high rail 124, a mid-point rail 126 and a low rail 128 that are coupled to corresponding power outputs of rectifier 108 and power inputs of inverter 112. An input 130 of rectifier 108 is coupled through rectifier input inductor 104 and common mode choke 102 to a rectifier power source 132. Rectifier input capacitor 106 is coupled between a junction of common mode choke 102 and rectifier input inductor 104 and a common 134 (which floats about ground but is not directly connected to ground). An output 133 of inverter 112 is coupled through inverter output inductor 114 through an over current protection device 136 (such as a fuse) to load 138. Inverter output capacitor 116 is coupled between a junction of inverter output inductor 114 and over current protection device 136 and common 134. Control module 122 is coupled to bypass switch 120, rectifier 108 and inverter 112. It should be understood that these power sources are not part of UPS system 100 but are typically power feeds such as from a utility.

FIG. 2 is a basic schematic showing the double conversion portion of UPS system 100 in more detail. As can be seen from FIG. 2, each of the three phases (A, B and C) includes a respective common mode choke 102 (designated $102_A$, $102_B$, $102_C$), a respective rectifier input inductor 104 (designated $104_A$, $104_B$, $104_C$), a respective rectifier input capacitor 106 (designated $106_A$, $106_B$, $106_C$), a respective inverter output inductor 114 (designated $114_A$, $114_B$, $114_C$), a respective inverter output capacitor 116 (designated $116_A$, $16_B$, $116_C$) and an over current protection device 136 (designated $136_A$, $136_B$, 136). The three phases of three phase rectifier 108 are designated $108_A$, $108_B$, $108_C$) and the three phases of three phase inverter 112 are designated $112_A$, $112_B$, $112_C$. A respective input 130 (designated $130_A$, $130_B$, $130_C$) of each rectifier phase is coupled to a respective phase (designated $132_A$, $132_B$, $132_C$) of rectifier power source 132. DC bus 110, comprised of high rail 124, mid-point rail 126 and low rail 128, is a common DC bus for the three phases.

When UPS system 100 is operating in a double conversion mode, rectifier 108 converts the incoming AC power from rectifier power source 132 to direct current ("DC") power on DC bus 110. Inverter 112 converts the DC power on DC bus 110 to AC output power that is then supplied to load 138. In some cases, UPS system 100 is switched to a bypass mode where bypass switch 120 is closed. AC power then flows directly from a bypass power source 140 to load 138. UPS system 100 may be switched to the bypass mode when a component of UPS system 100 in the double conversion power flow path fails, such as rectifier 108 or inverter 112, or when the quality of AC power from bypass power source 140 is sufficient that it can be used to directly power load 138 without being conditioned through the double conversion path. It should be understood that power sources 132, 140 are not part of UPS system 100 but are typically power feeds such as from a utility.

Control module 122 controls the rectifier 108, inverter 112, and bypass switch 120. Control module 122 monitors the input and output voltages and currents and controls the rectifier 108 to charge the battery (not shown) and regulate the DC power including the DC bus voltage and also controls inverter 112 to regulate the AC output power including the AC voltage.

The output voltage of UPS system 100 is generated by control module 122 modulating the pulse width of the output of inverter 112. It typically does so by switching power semiconductors (FIG. 2) of inverter 112 at the desired modulated pulse width.

Under normal operating conditions the inverter 112 synchronizes the output voltage to the voltage of bypass power source 140. Since the rectifier power source and bypass power source are different power sources, inverter 112 and rectifier 108 may not be in sync. With the inverter 112 and rectifier 108 not in sync, when the inverter 112 is paralleled with the bypass power source 140, there will be a common mode current induced due to the PWM method used to control inverter 112, which is implemented in control module 122. In FIG. 1, the common mode current path is designated by the dotted line 142. The load current path when UPS system 100 is in the bypass mode is designated by the solid line 144.

To limit this common mode current, common mode choke 102 is inserted in the common mode current path. The dimensions and weight of the common mode choke depend on the power rating of the UPS. For example, a common mode choke for a 800 kVA UPS could have a volume of 3500 in$^3$ and weigh over 500 pounds. The bulk of the weight is in the copper windings and laminated steel in the core which could cost as much as $2,500. So if this common mode choke could be eliminated, the UPS would cost less and have a smaller footprint.

SUMMARY

This section provides a general summary of the disclosure, and is not a comprehensive disclosure of its full scope or all of its features.

In accordance with an aspect of the present disclosure, the common mode choke in a 3-wire transformer free UPS system with which different rectifier and bypass power sources are used is eliminated by using different types of PWM control depending on whether the inverter is paralleled with the bypass source. When the inverter is paralleled with the bypass power source, a type of PWM control is used that does not have common mode voltage injection. When the inverter is not paralleled with the bypass power source, a type of PWM control is used that has common mode voltage injection. In an aspect, the PWM control that does not have common mode voltage injection is sine-triangle PWM and the PWM control that has common mode voltage injection is space-vector PWM.

In accordance with an aspect of the present disclosure, undesirable circulating currents are reduced when the inverter of a 3-wire transform-free UPS operates in parallel with the bypass power source without the need for high cost magnetic components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 3:
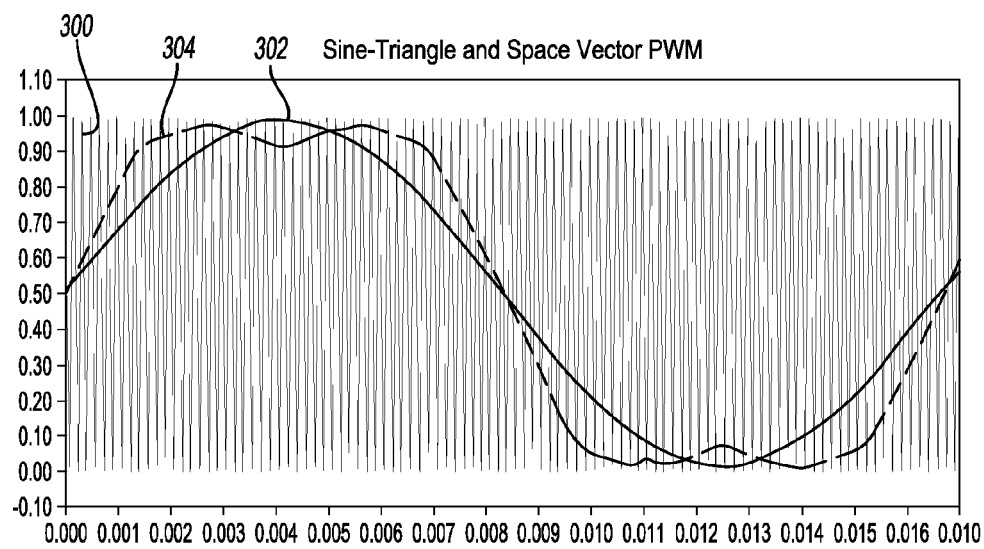
FIG. 3 is an illustration of sine-triangle PWM control and space vector PWM control.

There are two commonly used types of PWM control in 3-wire transformer-free UPS systems, namely sine-triangle and space vector PWM. The pulse widths are generated by comparing a reference voltage with a carrier signal 300, as shown in FIG. 3. The sine-triangle reference voltage is designated by 302 in FIG. 3 and the space vector reference voltage is designated by 304 in FIG. 3.

Figure 1:
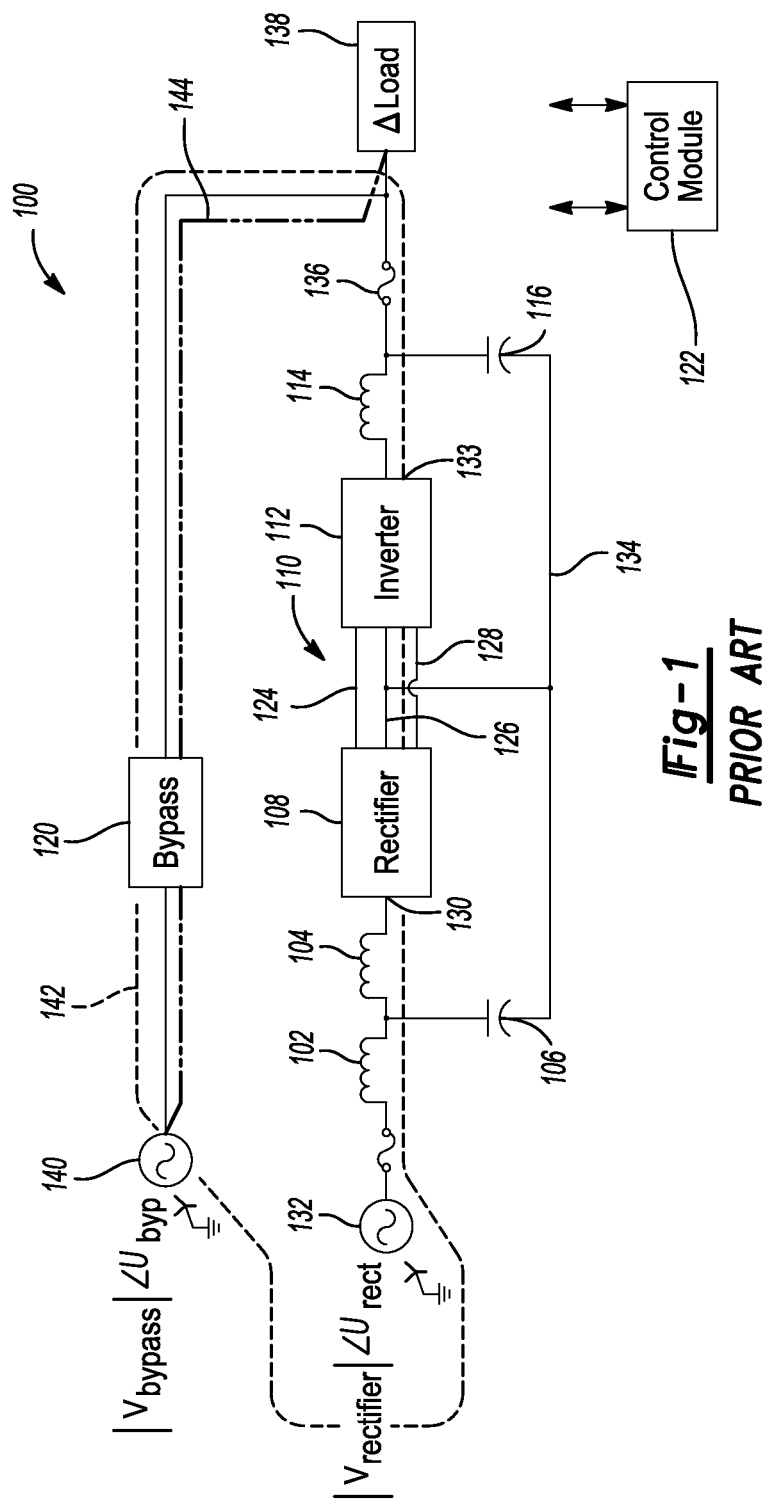
FIG. 1 is a basic block diagram of a prior art 3-wire transformer-free double conversion UPS system.
Figure 2:
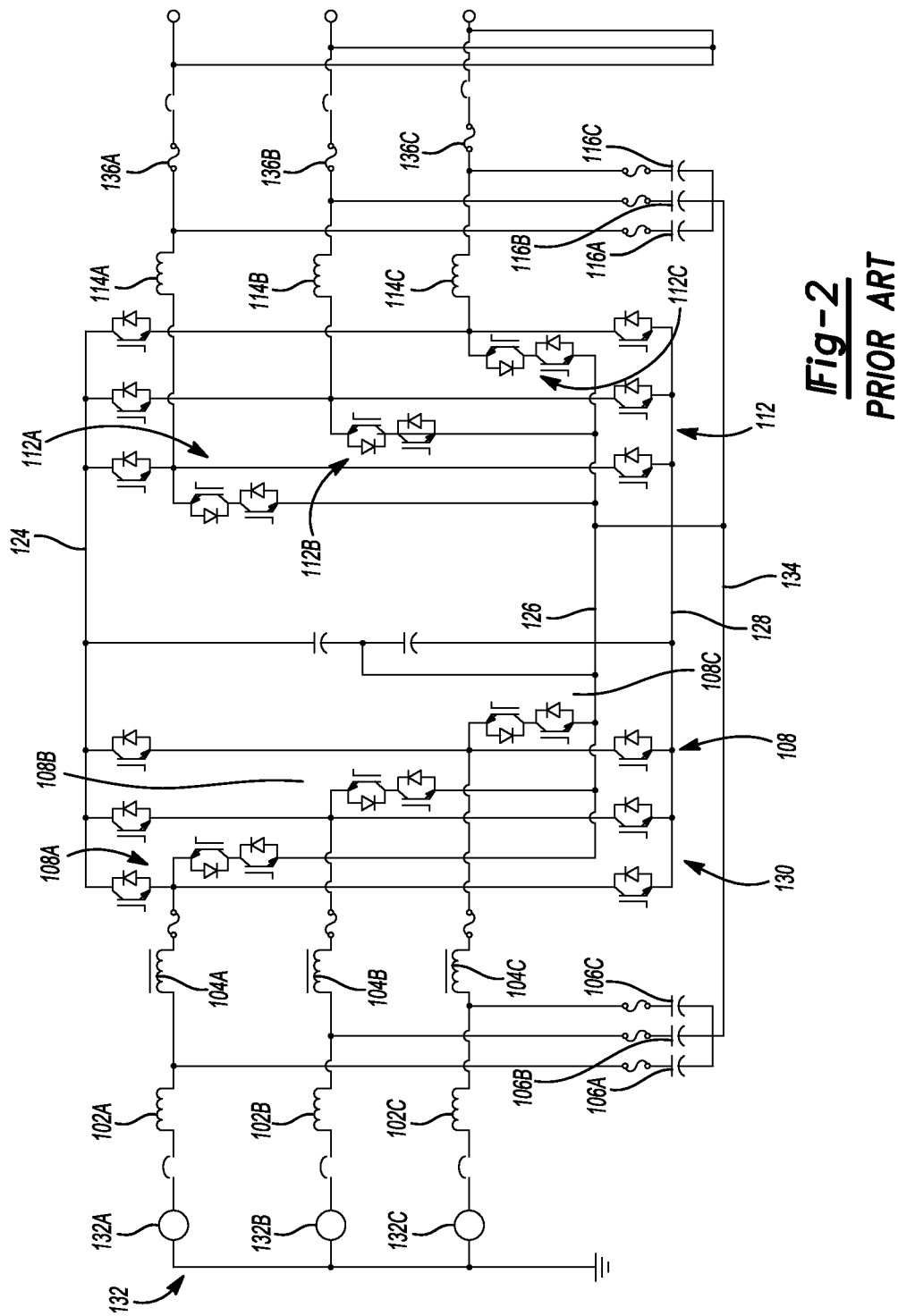
FIG. 2 is a basic schematic of the double conversion portion of the UPS system of FIG. 1.

The space vector reference voltage has harmonic components whereas the sine-triangle reference is a perfect sine wave. The harmonics in the space vector signal are comprised of triplen harmonics, e.g., 3rd, 9th etc. These triplen harmonics create a common mode voltage in the output voltage of the UPS system when measured from line-to-ground, that is, the same common mode voltage is simultaneously present on all three phases of the 3-wire system. These harmonics are not present when measuring from line-to-line since the common voltage will be canceled by the differential measurement. For 3-wire systems, the load is always line-to-line and so space vector PWM is perfectly suited. However, when the inverter is paralleled with the bypass power source that is grounded, as shown in FIG. 1, the common mode voltage will drive a common mode current (common mode current path 142) that could cause problems for the power source (either or both the bypass power source and the rectifier power source). It should be understood that while the bypass power source and rectifier power source are grounded, typically being wye power sources having grounds, this ground is not brought into the double conversion portion of the UPS system.

Figure 4:
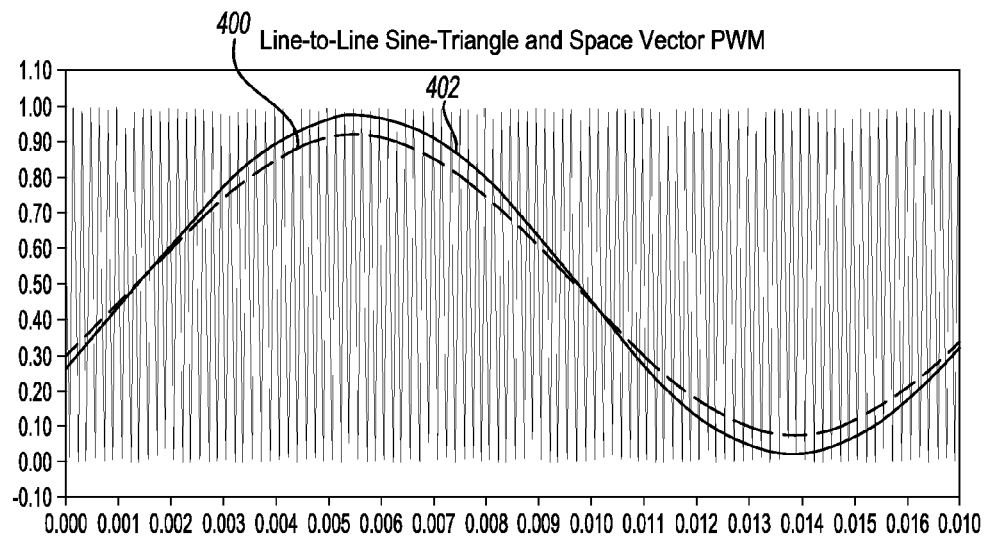
FIG. 4 is an illustration showing equivalent line-to-line voltage for sine-triangle PWM control and space-vector PWM control.

The sine-triangle PWM control does not have this shortcoming since it does not contain this common mode voltage. However, the sine-triangle PWM control has the drawback of requiring a higher DC bus voltage to generate the same AC output voltage. FIG. 4 shows the equivalent line-to-line voltages for the space vector and sine-triangle PWM control. The line-to-line voltage for the space vector PWM control is designated by 400 in FIG. 4 and the line-to-line voltage for the sine-triangle PWM control is designated by 402 in FIG. 4. As can be seen from FIG. 4, the space vector line-to-line voltage signal is higher than the sine-triangle voltage signal by approximately 15% so the DC bus voltage when the space vector PWM control is used can be 15% lower than when the sine-triangle PWM control is used, allowing the use of lower voltage rated components, particularly for the rectifier, inverter, rectifier input inductor, rectifier input capacitor, inverter output inductor and inverter output capacitor.

Figure 6:
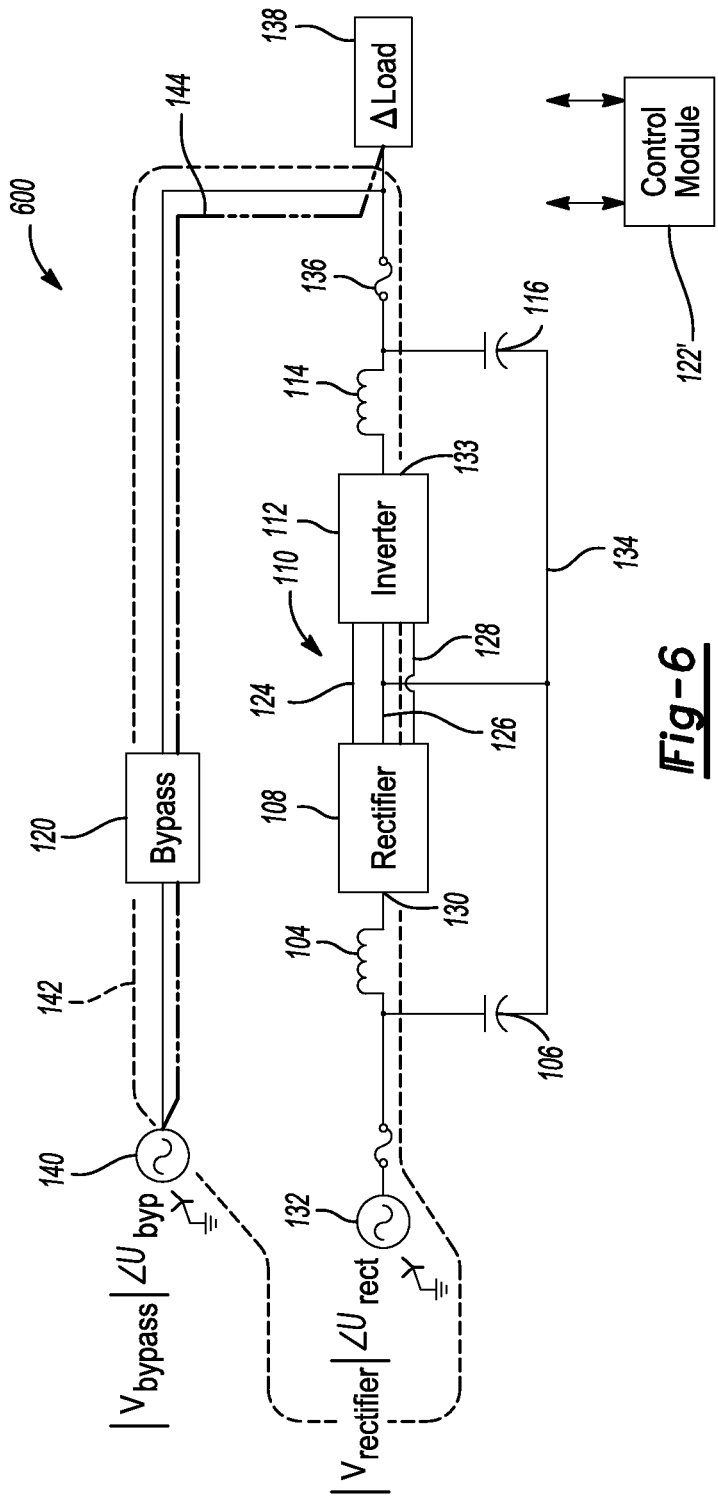
FIG. 6 is a basic block diagram of a 3-wire transformer-free double conversion UPS system in accordance with an aspect of the present disclosure.

In accordance with an aspect of the present disclosure, both the sine-triangle PWM control and the space vector PWM control are used to control the inverter of a 3-wire transformer-free UPS system, such as inverter 112 of UPS system 600 (FIG. 6), with which separate rectifier and bypass power sources 132, 140 are utilized. UPS system 600 is essentially the same as UPS system 100 except that UPS system 600 does not have common mode choke 102 and control module 122' is configured to use both the sine-triangle PWM control and space vector PWM control to control inverter 112.

Figure 5:
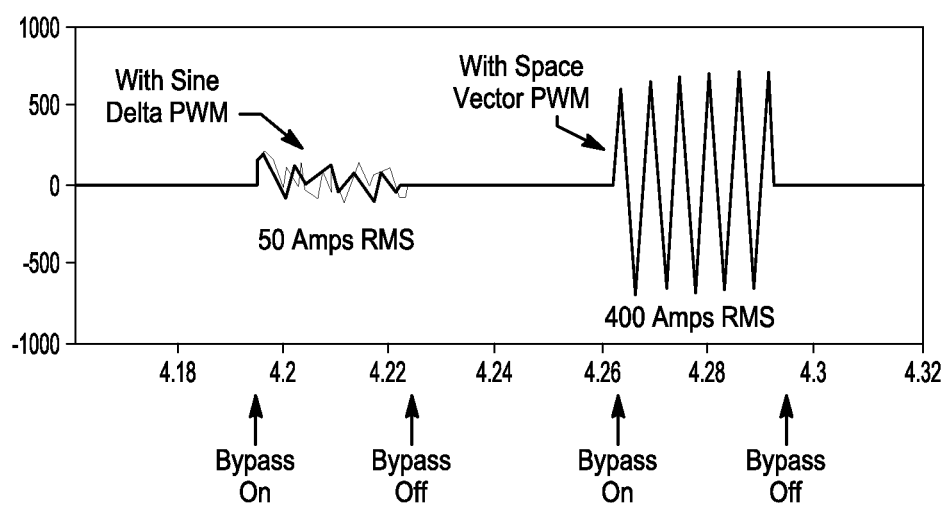
FIG. 5 is an oscilloscope trace showing circulating common mode current with space vector PWM control and also with sine-triangle PWM control.

Whether the sine-triangle PWM control or the space vector PWM control is used depends on the operating mode of the UPS system. With reference to UPS system 100, when UPS system 100 is operating in the double conversion mode, inverter 112 supplies all the power to load 138 so the space vector PWM control is used to control inverter 112 to generate a full line-to-line voltage at output 133 of inverter 112. When the load 138 is transferred to bypass, control module 122 switches to the sine-triangle PWM control which is then used to control inverter 112 during the transfer of the load 138 to bypass during the period when the inverter 112 is paralleled with bypass power source 140. Once the load 138 is fully transferred to bypass, inverter 112 is shut down to save power. Likewise, when the UPS system 100 is in the energy saver mode where the inverter 112 is continuously paralleled with the bypass power source 140, the sine-triangle PWM control is used to control inverter 112. The benefit of changing between the two PWM controls based on the operating mode of UPS system 100 is shown in FIG. 5, in which UPS system 600 is a 800 KVA UPS system. As shown in FIG. 5, using the sine-triangle PWM control to control inverter 112 when UPS system 600 is in the energy saver mode results in a common mode current circulating through the path 142 (FIG. 6) of about 50 amps RMS. In contrast, if the space vector PWM control was used to control inverter 112 when UPS system 600 is in the energy saver mode, this results in a common mode current circulating through the path 142 of about 400 amps RMS.

As would be understood by one of ordinary skill in the art, in the energy saver mode the bypass switch is closed and the bypass power source is the main source of power to the load. The inverter of the UPS system is paralleled with the bypass power source to condition the power provided to the load to improve the quality of the power, such as harmonic reduction.

The alternate approaches are to use only the sine-triangle PWM control (which requires the use of higher voltage rated components) or the space vector PWM control (which requires the use of the common mode choke). As discussed above, both these alternatives add cost and lower the efficiency of the UPS system.

Control module 122' in which the above described types of PWM control are implemented may be or include a digital processor (DSP), microprocessor, microcontroller, or other programmable device which are programmed with software implementing the above described types of PWM control. It should be understood that other logic devices can be used, such as a Field Programmable Gate Array (FPGA), a complex programmable logic device (CPLD), or application specific integrated circuit (ASIC). When it is stated that control module 122' performs a function or is configured to perform a function, such as controlling inverter 112, it should be understood that control module 122' is configured to do so with appropriate logic (software, hardware, or a combination of both), such as by appropriate software, electronic circuit(s) including discrete and integrated logic, or combination thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a double-conversion three-wire transformer free uninterruptible power supply system having a rectifier and a bypass switch, the rectifier coupled to a rectifier bypass source and the bypass switch coupled to a bypass power source wherein the rectifier power source and the bypass power sources are different power sources, the uninterruptible power supply system including an inverter and a control module, comprising:
   controlling the inverter with the control module with a pulse width modulation control that does not have common mode injection when the inverter is paralleled with the bypass power source and with a pulse width modulation control that has common mode injection when the inverter is not paralleled with the bypass power source
   wherein controlling the inverter with pulse width modulation control that does not have common mode injection comprises controlling the inverter with a sine-triangle pulse width modulation control and controlling the inverter with pulse width modulation control that has common mode injection comprises controlling the inverter with space-vector pulse width modulation control.

2. A double conversion three-wire uninterruptible power supply system, comprising:
   a rectifier coupled to a rectifier power source without a common mode choke in series between the rectifier and the rectifier power source, the rectifier having an output coupled to an input of an inverter;
   a bypass switch coupled to a bypass power source that is different than the rectifier power source; and
   a control module that controls the rectifier, bypass switch and inverter, the control module configured to control the inverter with a pulse width modulation control that does not have common mode injection when the inverter is paralleled with the bypass power source and with a pulse width modulation control that has common mode injection when the inverter is not paralleled with bypass power source.

3. The uninterruptible power supply system of claim 2 wherein the pulse width modulation control that does not have common mode injection is sine-triangle pulse width modulation control and the pulse width modulation control that has common mode injection is space-vector pulse width modulation control.

* * * * *